C. W. EBELING.
SYNCHRONIZING MEANS FOR MOTION PICTURE PROJECTORS AND SOUND REPRODUCING MECHANISMS.
APPLICATION FILED SEPT. 14, 1918.

1,303,047.

Patented May 6, 1919.
6 SHEETS—SHEET 1.

Fig. 1.

Witnesses

Charles W. Ebeling, Inventor by C. A. Snow & Co., Attorneys

C. W. EBELING.
SYNCHRONIZING MEANS FOR MOTION PICTURE PROJECTORS AND SOUND REPRODUCING MECHANISMS.
APPLICATION FILED SEPT. 14, 1918.

1,303,047.

Patented May 6, 1919.
6 SHEETS—SHEET 3.

Witnesses

Charles W. Ebeling Inventor
by C. A. Snow & Co.
Attorneys

UNITED STATES PATENT OFFICE.

CHARLES W. EBELING, OF NEW YORK, N. Y.

SYNCHRONIZING MEANS FOR MOTION-PICTURE PROJECTORS AND SOUND-REPRODUCING MECHANISMS.

1,303,047.  Specification of Letters Patent.  Patented May 6, 1919.

Application filed September 14, 1914. Serial No. 861,697.

*To all whom it may concern:*

Be it known that I, CHARLES W. EBELING, a citizen of the United States, residing at New York, in the county of New York and State of New York, have invented a new and useful Synchronizing Means for Motion-Picture Projectors and Sound-Reproducing Mechanisms, of which the following is a specification.

The object of the invention is to provide means whereby sound reproducing mechanism will automatically control the speed and insure the synchronism of a motion picture projector, either retarding or hastening the latter according to the speed of the former.

It has been found essential in order that the sound reproduction may be natural and uniform, that the mechanism controlling the same be operated independently of and not by the motion picture projector, and inasmuch as the normal motor actuation of the projector is more or less irregular regardless of the rapidity thereof, whereas motor actuation of sound reproducing mechanism is more uniform in speed, it is desirable that mechanism be interposed between the two to effect the retardation or the acceleration of the speed of the projector according to any slight fluctuations of the speed of the sound reproducing mechanism.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Referring to the drawings, the numeral 1 designates the shaft operated by the motor of the motion picture projector P, the same having fixed thereupon the large pulley 2, said shaft 1 also having led therefrom, the flexible shaft 3 which as will later appear constitutes the drive for the differential switch controlling means.

Figure 1:
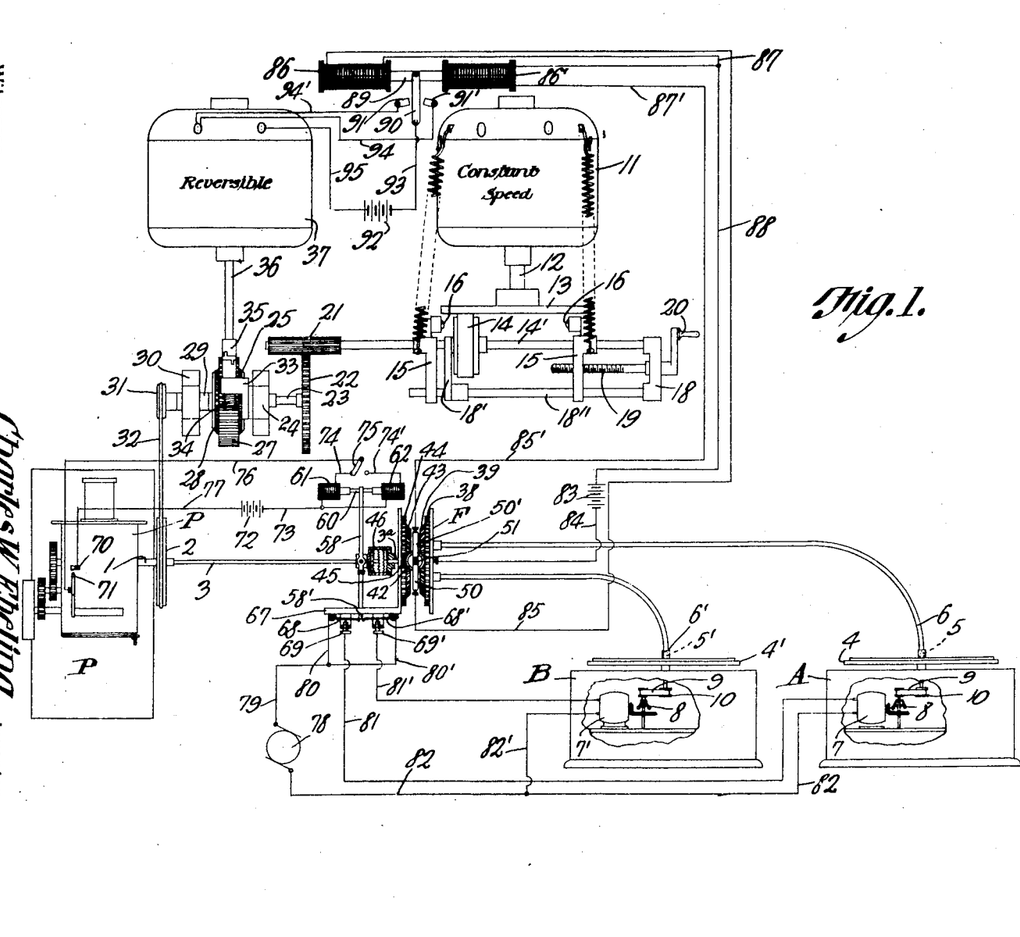
Figure 1 is a diagrammatic view of the complete mechanism, two sound reproducing machines being illustrated.
Figure 2:
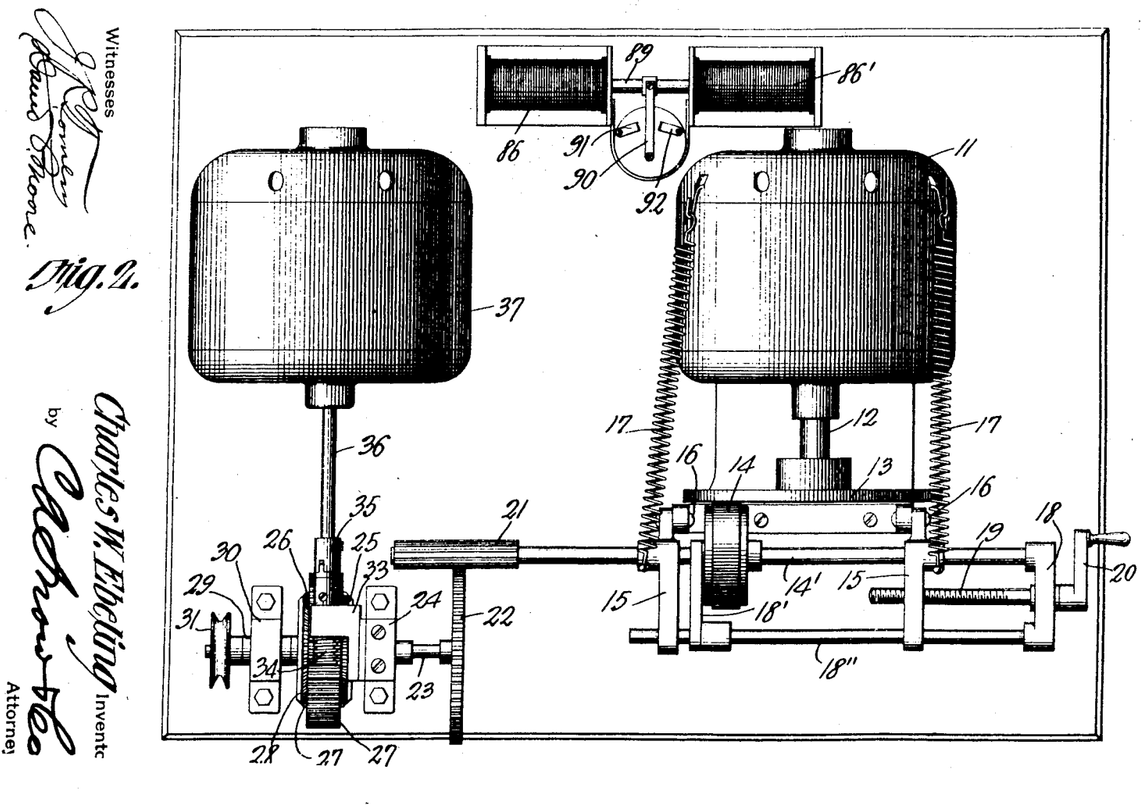
Fig. 2 is a top plan view of the constant speed and the reversible electric motors used in connection with the power transmission and regulating means for the projector.
Figure 3:
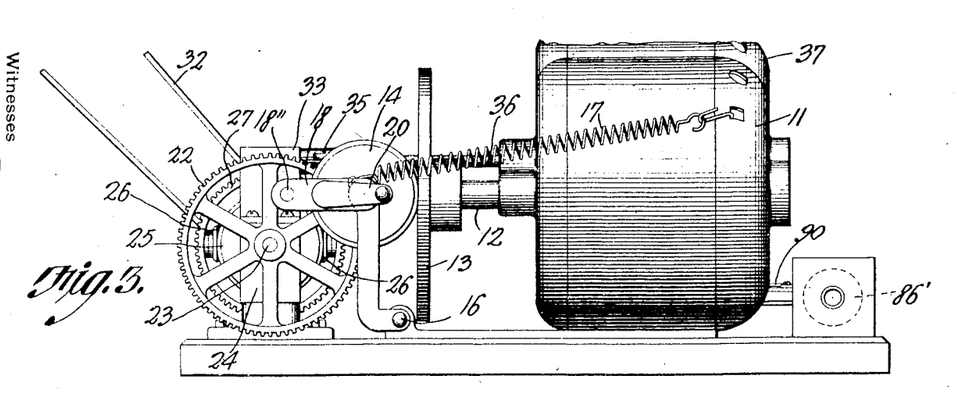
Fig. 3 is a side elevation taken from the right as viewed in Fig. 2 thereof.
Figure 4:
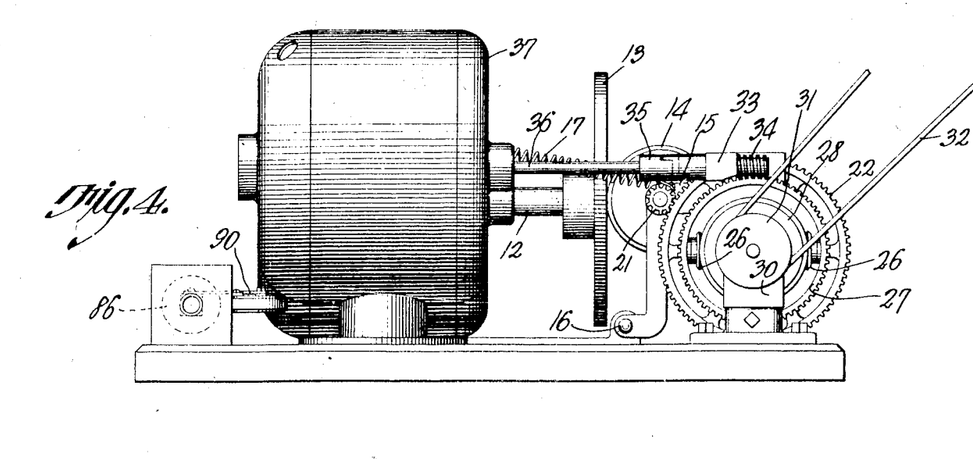
Fig. 4 is a view similar to Fig. 3 taken at the opposite side of the mechanism shown in Fig. 2.
Figures 5, 6, 7:
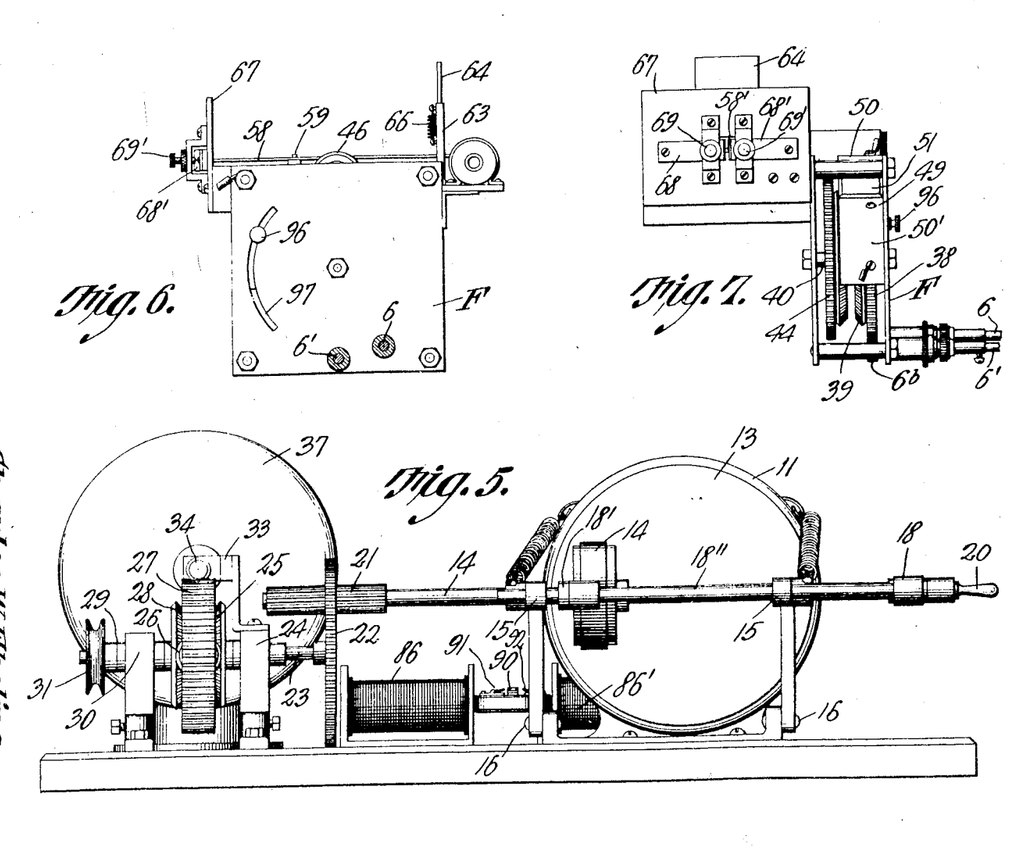
Fig. 5 is a front elevation of the mechanism as shown in Fig. 2.
Figs. 6, 7, 8, 9 and 10 are detail views of the switch controlling differential mechanism and the adjacent parts thereof showing the connection thereof from the sound reproducing machines and the projector machines.

In this instance, two sound reproducing machines A and B are shown, the same being merely indicative of any form of machine either of the disk or cylinder type, which are adapted to be operated by electric motors, such as illustrated at 7 and 7'. Each machine in this instance is provided with the rotatory record carrier 4—4' whose vertical shaft 5—5' is extended thereabove and has detachably connected thereto its respective end of the flexible shaft 6—6'.

Thus it will be seen that the projector P rotates the shaft 3, while the shafts 5 and 5' of the machines A and B rotate their respective shafts 6—6', one shaft of these two being operated at a time.

Each sound reproducing machine as here illustrated contains a motor 7—7' operating the governor device 8, which in turn operates the belt 9 to actuate the spool 10 of its respective shaft 5 or 5'. Thus each machine A or B has its individual motor, and thus the desired rotation is imparted to the carrier 4 or 4', to secure from the disk record R disposed thereupon, the best possible sound transmission.

In any form of apparatus, although not shown, it is preferable that a telephonic sound transmitting means be provided so that the machines A and B may be located within the booth adjacent to the projector P with the amplifying horns disposed adjacent to the screen or throughout the audience.

The electric motor 11, is a constant speed motor, and is the motor by means of which as will later appear, the projector P is operated. This motor is provided with the shaft 12, which has disposed thereupon a friction disk 13, adapted to operate the friction wheel 14 carried upon its shaft 14'. This shaft 14' is mounted both for sliding and rotary movements in the brackets 15, which in turn are pivoted to the base of the motor as at 16 so that the spring 17 controlling the same will hold the friction wheel 14 into frictional engagement with the disk 13, so that when the disk 13 rotates, the shaft 14' will be operated.

In order to adjust the shaft 14' and consequently, the friction wheel 14 transversely of the disk 13, and thus regulate the speed of the shaft 14', the frames 18 and 18' are provided being properly spaced from the shaft 14' by means of the rod 18''. Fixed to the outer end of the shaft 14' and the rod 18'', is the frame 18, which has disposed therein, for rotation, the screw 19, which threadedly engages the arm 15 so that when the crank 20 is rotated, the desired longitudinal movement is imparted to the shaft 14' and consequently to the friction wheel 14.

Fixed upon the free end of the shaft 14' is a long pinion 21, to permit of the necessary longitudinal movement thereof relatively to its driven gear 22. This gear 22 is fixed upon the short shaft 23 journaled in the bracket 24, and carries upon its opposite end for rotation therewith, the beveled gear 25. This beveled gear 25 is adapted to mesh with the two diametrically disposed gears 26, which are carried bodily by the annulus 27, the outer surface of which is a gear. Disposed in opposition to the beveled gear 25 is a beveled gear 28, which is fixed upon and rotates the shaft 29, the same being journaled in the bracket 30 and carrying the pulley 31, over which is trained the belt 32, which in turn engages the pulley 2 of the projector mechanism, so that when the pulley 31 is rotated, the motor of the projector is also operated as is also the flexible shaft 3.

With this mechanism, it is apparent that when the annulus 27 is maintained in a fixed position, that a regular or constant speed is transmitted from the shaft 23 to the shaft 29, but that by varying the relative position of the gear 26, that the speed of the shaft 29 may be retarded or accelerated. In order to accomplish this, there is a bracket 33 attached to the standard 24, that has journaled therein, a worm gear 34, which is in mesh with the teeth of the annulus 27 and is connected through the flexible connection 35 to the shaft 36 of the reversible electric motor 37. Thus by the rotation of the motor 37, the annulus 27 may be rotated in two directions and thus cause the gear 26 to be moved toward the rotation of the gear 25 thus accelerating the speed of the shaft 29 or away therefrom, thus retarding the speed thereof. This mechanism is exceedingly sensitive, and thus provides a differential means whereby the speed of the motor of the projector P may be regulated to an exactness and as will later appear.

*Differential switch actuating mechanism.*

The differential switch actuating mechanism clearly shown in Figs. 6 through 10, includes a frame F, in which is journaled the ends of the shafts 6 and 6' which carry respectively the small pinions 6ª and 6ᵇ, these pinions meshing with the gear 38 which is connected to and carries a beveled gear 39 both of which are rotatably mounted upon the stationary shaft 40 of the frame F. Mounted for independent rotation upon the shaft 40 between the beveled pinions 39 and 43 is an arm 41, which carries a small beveled pinion 42, the same meshing at all times with the respective pinions 39 and 43, so that as the gear 44 which is fast to the gear 43 is rotated by the shaft 3 through the shafts 3' and 3ª and the gear 45, and the gear 38 is rotated by either one of the shafts 6 or 6', at the same speed, arm 41 is maintained in a neutral position, any deviation of speed however, controlling or causing the arm 41 to move from its relatively adjusted or fixed position so as to operate and control the electric circuit, as will presently appear.

Adjustably mounted upon the shaft 40 within the frame F, as illustrated adjacent to the gear 38, is a segment 47, preferably made of metal, having secured thereto, a segmental block 48 of insulation, which in turn carries and holds insulated from the segment 47, the metal contact plate 49, provided with the contact surfaces 50 and 50' separated from each other by the block 51 of insulation.

Figure 10:
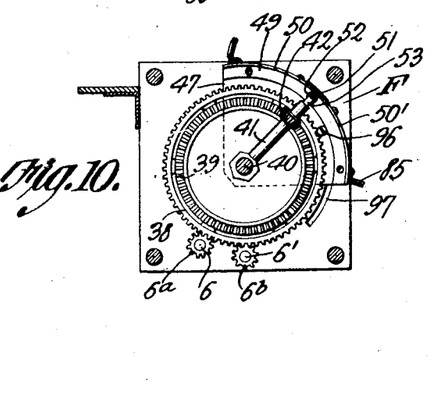

Under normal conditions, with the sound reproducing machine operating the shaft 6 or 6' and the projector operating the shaft 3, the arm 41 is held in the position as shown in Fig. 10, wherein the yieldingly held contact wheel 52 mounted in the slidable member 53 thereof, is held in contact with the block 51 of insulation. It is therefore apparent that at any deviation of speed between the shaft 6 and 6' and the shaft 3, the relative position of the arm 41 and the circuit controlling member 52 will be changed, the same moving into contact with either metal plate 50 or 50' and closing a circuit, as will presently appear to retard or accelerate the operation of the projector.

Figure 11:
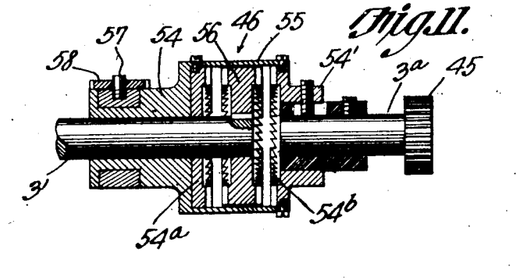
Fig. 11 is an enlarged detail view of the clutch for connecting the shaft of the projector mechanism to the differential switch operating mechanism.

Connected between the shaft 3′ or 3ª, as particularly illustrated in Fig. 11, is a clutch 46, the same including the two members 54—54′, to permit the shaft 3′ to rotate therein without affecting it, each of the members being connected for unitary sliding movement by means of the sleeve 55 and each carrying independent clutch members 54ª and 54ᵇ for coöperative action with the fixed double clutch member 56 carried by the shaft 3′. Thus it will be seen that as the members 54 and 54′ are moved in either direction, that either clutch member thereof will engage the rotating clutch member 56 and thus operably connect the shaft 3′ with the shaft 3ª and consequently cause the rotation of the gear 45 from the projector mechanism.

Clutch throwing mechanism.

Operably connected to the slidable member of the clutch is a pin 57, which connects the lever 58 thereto so that the clutch may be properly operated into either selected position or neutral position, the operation of which will later appear.

Figure 8:
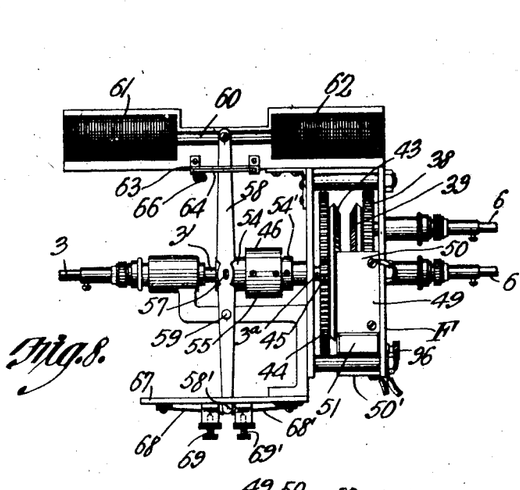
Figure 9:
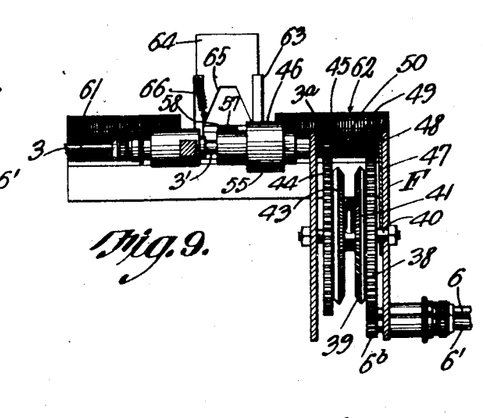

The lever 58 is pivoted intermediate of its ends at 59, as illustrated in Fig. 8, and so disposed that its end 58′ will slide through the supporting block 67 while its opposite end is connected to the cores 60 of the two oppositely disposed solenoids 61 and 62.

In order to provide a means for locking the lever 58 in neutral position, there is provided between the solenoids, the guiding support 63, in which is disposed the vertically slidable locking plate 64 having the recess portion 65 to fit astride of the lever 58, a spring 66 being provided to normally hold the locking member 64 in elevated position. The portion 65 is provided with inclined walls, so that the manipulator may depress the same to engage the lever 58 and move it in central or neutral position, the member 64 being released and the lever 58 remaining in such position until automatically operated as will presently appear.

In the plate 67 which is preferably made of insulating material and as before stated has the slot through which the end 58′ of the lever 58 projects, so that the respective resilient switch members 68 and 68′ may be selectively operated to engage the adjustable contact members 69—69′, as will presently appear.

In the present instance, the film controls the actuation of the solenoids 61 and 62, which are selected for operation manually through the instrumentality of the manually controlled switch 75. In this instance, as clearly illustrated in Figs. 1 and 14, the contacts 70 and 71 are disposed to be bridged or closed by the film 100 carrying the button 101 for closing the switch. Thus the circuit actuated when the contacts 70 and 71 are closed, includes the battery 72, the conductor 73, the solenoid 61, the conductor 74, the switch 75, the conductor 76, the contacts 70—71 and the conductor 77. When the switch is thrown in the opposite direction, to select the solenoid 62, the circuit is identical, except that the conductor 74 is cut out and the conductor 74′ is placed in the circuit. Thus when the solenoid 61 is energized, the lever 58 was pulled to the left and consequently caused the end 58′ to engage the resilient switch member 68′ to close the same upon the adjustable contact 69′ to close the circuit to operate the motor 7′ of the machine B, while at the same time the clutch 46 was operated to connect the clutch member 54ª to the clutch member 56, thus connecting the shaft 3′ with the shaft 3ª so that the gear 45 was rotated simultaneously with the energization of the motor 7′.

Electrical installation.

When the switch 68—69 is closed, the following circuit is energized, the same including the generator 78 which is indicative of any source of electrical energy, the conductors 79 and 80, the resilient contact 68, the adjustable contact 69, the conductor 81, the motor 7 and the conductor 82.

When the contact is made at 68′—69′, the circuit includes the generator 78, the conductors 79 and 80′, the resilient contact 68′, the adjustable contact 69′ the conductor 81′, the motor 7′, and the conductors 82′ and 82. Therefore it is noted that simultaneously with the operation of the clutch 46 in either direction, either one of the motors 7 or 7′ is started and the sound reproducing machine is thus set in operation.

It has been found in practice that at the initial starting or throwing in of the clutch 46, the projector having attained its full speed, the gear 43 will also rotate at normal speed, but as the motor 7 or 7′ has been gradually started, its shaft 6 or 6′ will be rotated slowly gradually increasing its speed, so as to slightly retard the action of the arm 41 and thus cause the reversing motor to be operated as will presently appear to move the annulus 27 in the direction of the gear 25 and consequently retard the speed, transmitted to the shaft 29 and to the pulley 2. By this means, the projector will be slowed down until the motor 7 or 7′ has attained full speed at which time as will presently appear, the member 27 is operated in the opposite direction and thus the shaft 29 is accelerated to bring the projector to the desired speed.

The circuit controlled by the differential switch and as particularly illustrated in Fig. 1, includes the battery 83, the conductor 84, the arm 41, the contact 52, the segmental plate 50, the conductor 85, the solenoid 86, and the conductors 87 and 88. Thus the solenoid 86 will be operated and through the core 89 controlled thereby, will operate the switch 90 so as to engage the contact 91, thus closing the following circuit to the motor 37. The battery 92, the conductor 93, the switch 90, the contact 91, the conductor 94', the motor 87 and the conductor 95.

When the contact 50' is engaged by the contact 52, the circuit to the solenoid 86' will be closed, the same including the battery 83, the conductor 84, the arm 41, the contact 52, the contact plate 50', the conductor 85', the solenoid 86', and the conductors 87' and 88. Thus the solenoid 86' will be energized and will operate the switch 90 in the opposite direction so as to reverse the operation of the motor 37, such motor 37 being shown merely indicative of a reversible motor. The circuit closed when the switch 90 engages the contact 91', includes the battery 92, the conductor 93, the switch 90, the contact 91', the conductor 94, the motor 37 and the conductor 95.

It will thus be seen that through the instrumentality of the arm 41 and its switch member 52, the operation of the motor 37 will be controlled through the solenoids 86 and 86' and that so delicate is this mechanism that the motor 37 will be immediately set in operation as soon as the arm 41 is moved to engage either contact plate 50 or 50', such action causing the proper rotation of the shaft 36 and its gear 34 so as to rotate the annulus 27 in the proper direction to retard or accelerate the rotation of the shaft 29 and consequently the motor of the projector.

The segmental plate 47 is adapted to be adjustably mounted within the frame F, the same having attached thereto, an adjusting screw 96, accessible from the outside of the frame F and for coöperation with the arcuate slot 97 which is concentric to the shaft 40. Thus by adjusting the member 47, the neutral or zero position of the arm 41 is obtained at the initial starting of the machine so that the speed of the respective record carriers 4 or 4' connected to their shafts 6 or 6' will in turn control the speed of the projector mechanism through the annulus 27 and its gear 26, as heretofore described.

Modification.

Figures 12, 13, 14:
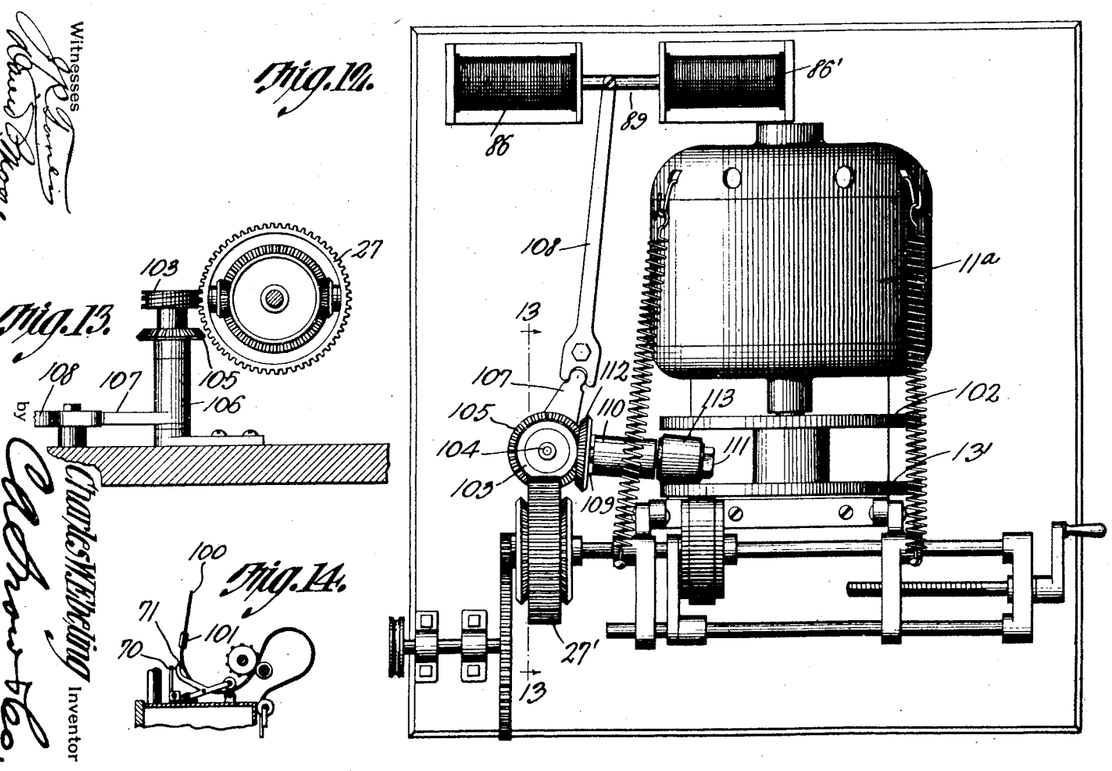
Fig. 12 is a top plan view of a modified form of power transmission and speed regulating means, in which a single motor and mechanically operated means is employed.
Fig. 13 is a section taken on line 13—13 of Fig. 12.
Fig. 14 is a detailed view of the film controlled switch.

In the modification as shown in Fig. 12, a single motor 11$^a$ which is similar to the motor 11, is provided and in addition to the friction disk 13' and the mechanism controlled thereby, which is similar to the disk 13 heretofore described, a separate friction disk 102 is disposed in spaced relation thereto and for rotation therewith. In this construction, the annulus 27' which corresponds to the annulus 27 is controlled by the vertically disposed worm 103 mounted upon the vertical shaft 104 and rotatable with the beveled gear 105, the sleeve 106 mounted upon the shaft 104 being provided with an arm 107 which is operated by the solenoid thrown lever 108 controlled by the solenoids 86 and 86'.

In this instance, the solenoids 86 and 86' instead of operating a reversing switch, control a mechanical means by means of which the direction of rotation of the annulus 27' is controlled. An arm 109 is carried by the sleeve 106 at one side thereof and in turn carries the sleeve 110, in which is journaled a shaft 111 having mounted upon one end the gear 112 which meshes at all times with the gear 105, and with the friction wheel 113 which is adapted to engage the inner face of the friction disk 13' or the adjacent face of the friction disk 102 both of which are constantly rotated in one direction, thus providing a means for rotating the shaft 111 in two directions and thus consequently imparting a two direction rotation selectively to the annulus 27' through the motor 11$^a$ which in turn controls the operation of the projector mechanism.

Operation.

From the foregoing description, taken in connection with the drawings, the operation of the present mechanism is readily understood, but briefly stated it is as follows:—

The film having been properly adjusted within the projector mechanism, and the segment 47 having been properly adjusted to zero or neutral point 51, the motor 11 is set in operation, and through the differential mechanism including the gear 25, 26, annulus 27, and the gear 28, operates the shaft 29, so that the belt 32 will operate the pulley 2 and consequently the projector P. At the same time, the shaft 3 will be operated, but inasmuch as the clutch 46 has not been thrown in, the gear 44 will be stationary. At the instant the film operates to close the contacts 70 and 71, the circuit to either one of solenoids 61 or 62 will be closed, operating the clutch throwing lever 58, which in turn throws in the clutch 46, thus operably connecting the shafts 3' and 3$^a$ together, so that the gear 45 is operated and in turn rotates the gear 44. Simultaneous with this action, either one of the switches 68—68' is closed, closing the circuit to either one of the motors 7 or 7' and thus setting in operation the selected sound reproducing machine A or B. Thus either one of the shafts 6 or 6' will be set in operation and in consequence, the gear 38 will be rotated. As before stated as the initial starting of the motor 7 or 7' is gradual, the shaft 6—6' will operate the arm 41, to close the circuit to the reversible motor 37 which in turn operates the annulus 27 to produce a slowing down effect between the shaft 23 and the shaft 29 and consequently the projector P. At the instant that the speed of the sound record has been obtained, the arm 41 will move to its neutral position with the contact in engagement with the block 51 of insulation, at which time, the circuit to the reversible motor is cut out and the annulus 27 will be held stationary so that the proper speed relation between the shafts 23 and 29 will be maintained.

Any fluctuations in speed of the shafts 6 or 6' of the machine A or B will thus affect the arm 41, causing the same to advance or retract and consequently operate the motor 37 through the solenoids 86 and 86' so that the rotation of the annulus 27 will be controlled in a forward or reverse direction according to the automatic actuation of the arm 41 to thus retard or accelerate the speed of the projector P.

In the mechanical installation as shown in Fig. 12, instead of the circuit to the reversible motor 37 being controlled, the lever 108 is controlled to move the friction member 113 into and out of engagement with the respective disks 13' or 102, the neutral position of the solenoids 86 holding the friction member 113 out of contact with both, so that the annulus 27' will be held in a stationary position and the desired normal speed will be transmitted to the projector P.

This mechanism, however, throws a slight load upon the motor 11ª that may prove detrimental, it therefore being preferable to use a reversible motor which is separate from the motor 11 as illustrated in Fig. 1, and thus permitting the motor 11 to operate the same mechanism at all times and at the desired constant speed.

With this mechanism, it is evident that as the sound reproducing machines are individual machines, the same sound transmission can be obtained that is attained with machines of this character when operated alone, and that both the projector and the sound record machines may be operated individually yet the speed of the projector mechanism is controlled automatically without detrimental effect upon either machine through the instrumentality of a differential switch which is mainly controlled by the fluctuations of speed in the sound reproducing machine.

It will thus be seen that any retardation of the sound record carrier will cause a similar retardation in the projector mechanism while any acceleration of the speed of the sound reproducing machine will also cause a similar acceleration in the operation of the projector mechanism.

It is also apparent that any guess work as to the operation of the present mechanism is entirely eliminated, it merely being essential that the segment 47 be properly adjusted at the initial starting of operation, the remainder of the mechanism being operated automatically after the projector mechanism is once set in operation by connecting the circuits that operate the constant speed motor 11.

Where a plurality of machines are illustrated as shown, the machine A is first operated, the switch 75 being moved to the position as shown in Fig. 1 at the initial starting of the mechanism and as soon as the solenoid 61 has been energized and the lever 58 thrown to connect the clutch for operating a differential switch and for also closing the circuit to the motor 7 of the machine A, the operator may operate the switch 75 to select the solenoid 62 so that the machine B will be brought into operation at the desired time, and there will be a continuous action where desired between the operation of the machines A and B, the connection of one or the other by the operation of a solenoid 61 or 62 causing the automatic switch connection of the corresponding motor circuit.

Should the stylus skip a groove in the sound record, it is merely necessary to manipulate screw 96 to adjust the segment 47 so that the projector will catch up to the said record.

What is claimed is:

1. In a device of the class described, the combination with two machines, an independent motor for each machine, means controlled by one machine for setting in motion the motor of the second machine, and a differential speed transmission means interposed between the one machine and its motor, of automatic means controlled by both machines for controlling the latter means, whereby the speed of one machine is regulated in accordance with the speed of the other machine.

2. In a device of the class described, the combination with two machines, an independent electric motor for each machine, means controlled by one machine for setting in motion the motor of the second machine, and a differential gear interposed between the one machine and its motor, of automatic means controlled by both machines for controlling the latter means, whereby the speed of the one machine is regulated in accordance with the speed of the other machine.

3. In a device of the class described, the combination with two machines, an independent electric motor for each machine, means controlled by one machine for setting in motion the motor of the other machine, and a differential speed transmission means interposed between one machine and its motor, of adjustable automatic means controlled by both machines for in turn controlling the latter means, whereby the speed of the one machine is regulated in accordance with the other machine.

4. In a device of the class described, the combination with two machines, an independent motor for each machine, means for controlling the starting of one of the machines from the other machine, and a differential gear interposed between the other machine and its motor, whereby the speed of the other machine is retarded or accelerated, of automatic means controlled by both machines for actuating the differential gear to regulate the speed of the other machine in accordance with the speed of the one machine.

5. In a device of the class described, the combination with two machines, an independent motor for each machine, means for controlling the starting of one of the machines from the other machine, and a differential gear interposed between the other machine and its motor. whereby the speed of the one machine is retarded or accelerated, of adjustable automatic means controlled by both machines for actuating the differential gear to regulate the speed of the other machine in accordance with the speed of the one machine.

6. In a device of the class described, the combination with two machines, an independent motor for each machine, means controlled by one of the machines for setting in operation the motor of the other machine, means interposed between the one machine and its motor for causing the retardation or acceleration of the such machine, and a motor for operating said means, of automatic means controlled by both machines for controlling the operation of the last motor, whereby the speed of the one machine is regulated in accordance with the speed of the other machine.

7. In a device of the class described, the combination with two machines, an independent motor for each machine, means controlled by one of the machines for setting in operation the motor of the other machine, means interposed between the one machine and its motor for causing the retardation or acceleration of such machine, and a motor for operating the same, of adjustable automatic means controlled by both machines for controlling the operation of the last motor, whereby the speed of the one machine is regulated in accordance with the speed of the other machine.

8. In a device of the class described, the combination wth two machines, an independent motor for each machine, means controlled by one machine for setting in motion the motor of the other machine, a speed controlling mechanism interposed between the first mentioned machine and one of the motors, and a reversible electric motor for controlling the speed controlling mechanism, of automatic means controlled by both machines for in turn controlling the operation of the reversible motor and thereby regulating the speed of the first mentioned machine in accordance with the speed of the other machine, said automatic means including two shafts, one operated by the first mentioned machine and the other operated by the other machine, two gears, one connected to each shaft, and a circuit controlling member actuated by both gears, whereby the variation of speed between the two gears will control the reversible motor.

In testimony that I claim the foregoing as my own, I have hereto affixed my signature in the presence of two witnesses.

CHARLES W. EBELING.

Witnesses:
S. C. ADAMS,
G. W. M. RHODES.

---

Correction in Letters Patent No. 1,303,047.

It is hereby certified that in Letters Patent No. 1,303,047, granted May 6, 1919, upon the application of Charles W. Ebeling, of New York, N. Y., for an improvement in "Synchronizing Means for Motion-Picture Projectors and Sound-Reproducing Mechanisms," an error appears requiring correction as follows: In the drawings, Sheets 1–6, in headings, date of filing application, for "Sept. 14, 1918" read *Sept. 14, 1914;* and that the said Letters Patent should be read with this correction therein that the same may conform to the record of the case in the Patent Office.

Signed and sealed this 17th day of June, A. D., 1919.

[SEAL.]

J. T. NEWTON,

*Commissioner of Patents.*

Cl. 172—293.